(12) United States Patent
Maric et al.

(10) Patent No.: US 12,007,810 B2
(45) Date of Patent: Jun. 11, 2024

(54) ELECTRONIC DEVICES WITH ANTENNAS AND OPTICAL COMPONENTS

(71) Applicant: Apple Inc., Cupertino, CA (US)

(72) Inventors: Ivan S. Maric, San Francisco, CA (US); Anthony S. Montevirgen, Redwood City, CA (US); Evan D. Christensen, Campbell, CA (US); Lijun Zhang, Los Gatos, CA (US); Phil M. Hobson, Menlo Park, CA (US); Samuel A. Resnick, San Francisco, CA (US); Yi Jiang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 238 days.

(21) Appl. No.: 17/206,010

(22) Filed: Mar. 18, 2021

(65) Prior Publication Data

US 2021/0333823 A1 Oct. 28, 2021

Related U.S. Application Data

(60) Provisional application No. 63/014,632, filed on Apr. 23, 2020.

(51) Int. Cl.
*G06F 1/16* (2006.01)
*G02B 7/12* (2021.01)
(Continued)

(52) U.S. Cl.
CPC .............. *G06F 1/163* (2013.01); *G02B 7/12* (2013.01); *G06F 1/1686* (2013.01); *H01Q 1/38* (2013.01);
(Continued)

(58) Field of Classification Search
CPC .. G02B 27/0176; G02B 27/0172; G02B 7/12; G02B 2027/0163; G02B 2027/0138;
(Continued)

(56) References Cited

U.S. PATENT DOCUMENTS 9,065,175 B2* 6/2015 Corbin ................... H01Q 1/243
9,496,608 B2* 11/2016 Jiang ..................... H01Q 1/245
(Continued)

FOREIGN PATENT DOCUMENTS

CN 104160320 A 11/2014
CN 205159492 U 4/2016
(Continued)

*Primary Examiner* — Pritham D Prabhakher
(74) *Attorney, Agent, or Firm* — Treyz Law Group, P.C.; Tianyi He

(57) ABSTRACT

A head-mounted device may have a head-mounted housing. The housing may include a frame with left and right openings that receive respective left and right optical modules that present images to a user's eyes. Each optical module may have a lens and display that presents an image through the lens. Camera support members may be coupled to respective left and right peripheral portions of the frame. Each camera support member may have openings configured to receive cameras. Antennas may be formed on a camera support member. The antennas may have metal traces on a surface of the camera support member, may have conductive structures embedded within the camera support member, and/or may have patterned metal traces on printed circuits attached to or embedded in the camera support member. The cameras may operate through portions of a display cover layer that covers an outwardly-facing display on the head-mounted housing.

19 Claims, 11 Drawing Sheets

(51) Int. Cl.
  *H01Q 1/38* (2006.01)
  *H01Q 1/40* (2006.01)
  *H04N 23/57* (2023.01)
  *H04N 23/90* (2023.01)

(52) U.S. Cl.
  CPC .............. *H01Q 1/40* (2013.01); *H04N 23/57* (2023.01); *H04N 23/90* (2023.01)

(58) Field of Classification Search
  CPC ........... G02B 2027/0161; H04N 23/90; H04N 23/57; G06F 1/163; G06F 1/1686; H01Q 1/38; H01Q 1/40
  USPC ......................................................... 348/376
  See application file for complete search history.

(56) References Cited

U.S. PATENT DOCUMENTS

| | | | |
|---|---|---|---|
| 9,812,768 | B2 | 11/2017 | Youm et al. |
| 10,008,764 | B2 * | 6/2018 | Jiang ................. H01Q 1/44 |
| 10,089,005 | B2 | 10/2018 | Xu et al. |
| 10,222,617 | B2 * | 3/2019 | Jannard ................. G02C 11/06 |
| 10,290,441 | B2 | 5/2019 | Weber et al. |
| 10,534,203 | B2 * | 1/2020 | Olgun ................. G02C 11/10 |
| 10,747,306 | B2 * | 8/2020 | Tokubo ................. A63F 13/332 |
| 11,063,338 | B2 * | 7/2021 | Hintermann .......... G06F 1/1698 |
| 11,175,503 | B2 * | 11/2021 | Franklin ............ G02B 27/0176 |
| 2010/0110368 | A1 * | 5/2010 | Chaum ................. G02C 11/10 351/158 |
| 2012/0194420 | A1 * | 8/2012 | Osterhout ............... G06F 3/013 345/156 |
| 2012/0206485 | A1 * | 8/2012 | Osterhout ............... G06F 1/163 345/633 |
| 2013/0293448 | A1 | 11/2013 | Jannard |
| 2014/0001022 | A1 * | 1/2014 | Weber ................. H05K 7/14 200/513 |
| 2014/0111684 | A1 * | 4/2014 | Corbin ................. H05K 1/0215 343/702 |
| 2014/0159995 | A1 * | 6/2014 | Adams ................. G02C 5/16 351/113 |
| 2014/0313087 | A1 * | 10/2014 | Jiang ................. H01Q 3/22 343/745 |
| 2015/0157078 | A1 * | 6/2015 | Kendis ................. A45F 5/02 24/3.12 |
| 2016/0079663 | A1 * | 3/2016 | Youm ................. H01Q 1/243 343/702 |
| 2016/0204839 | A1 * | 7/2016 | Liu ................. H04W 4/02 345/8 |
| 2016/0246055 | A1 * | 8/2016 | Border ............ G02B 27/0172 |
| 2017/0005397 | A1 | 1/2017 | Jiang et al. |
| 2017/0264817 | A1 * | 9/2017 | Yan ................. H04N 23/682 |
| 2017/0308258 | A1 * | 10/2017 | Xu ................. G06F 13/14 |
| 2018/0212309 | A1 * | 7/2018 | Camacho Perez ..... H01Q 13/06 |
| 2019/0033622 | A1 * | 1/2019 | Olgun ................. H04B 5/24 |
| 2019/0113967 | A1 | 4/2019 | Tokubo |
| 2019/0229395 | A1 * | 7/2019 | Hintermann .......... H01Q 1/273 |
| 2019/0369353 | A1 | 12/2019 | Franklin et al. |
| 2020/0138141 | A1 * | 5/2020 | Kwok ................. A42B 3/128 |
| 2021/0021768 | A1 * | 1/2021 | Tong ................. H04N 23/90 |
| 2021/0103146 | A1 * | 4/2021 | Travers ................. G02B 6/0076 |
| 2021/0266925 | A1 * | 8/2021 | Aly ................. H04W 72/1215 |

FOREIGN PATENT DOCUMENTS

| | | |
|---|---|---|
| CN | 209311784 U | 8/2019 |
| CN | 209928142 U | 1/2020 |
| EP | 2424034 A1 | 2/2012 |
| WO | 2017100074 A1 | 6/2017 |
| WO | 2020023303 A1 | 1/2020 |
| WO | 2020055456 A1 | 3/2020 |

* cited by examiner

ELECTRONIC DEVICES WITH ANTENNAS AND OPTICAL COMPONENTS

This application claims the benefit of provisional patent application No. 63/014,632, filed Apr. 23, 2020, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. The displays may be housed in optical modules. Lenses may be mounted in the optical modules. Images on the displays may be viewed through the lenses.

SUMMARY

A head-mounted device may have a head-mounted housing that is configured to be worn on a head of a user. The housing may include a frame with left and right openings that receive respective left and right optical modules that present images to a user's eyes. Each optical module may have a lens and display that presents an image through the lens. The left and right modules may be moved relative to each other to accommodate different user interpupillary distances.

Camera support members may be coupled to respective left and right peripheral portions of the frame. Each camera support member may have openings configured to receive cameras. During operation of the head-mounted device, the camera support member helps to maintain alignment between the cameras that are mounted to the camera support member.

Radio-frequency signals may be handled using antennas in the head-mounted device. Antennas may be formed on one or both camera support members. For example, a first antenna may overlap a first area of a camera support member and a second antenna may overlap a second area of a camera support member.

The antennas may have metal traces on a surface of the camera support member, may have conductive structures such as metal antenna members embedded within the camera support member, and/or may have patterned metal traces on printed circuits attached to or embedded in the camera support member. The cameras may operate through portions of a display cover layer that covers an outwardly-facing display on the head-mounted housing.

DETAILED DESCRIPTION

An electronic device such as a head-mounted device may have a front face that faces away from a user's head and may have an opposing rear face that faces the user's head. Optical modules may be used to provide images to a user's eyes. The positions of the optical modules may be adjusted to accommodate different user interpupillary distances. The head-mounted device may have actuators and optical module guide structures to allow the optical module positions to be adjusted.

The head-mounted device may have wireless communications circuitry to communicate with external equipment such as a computer, cellular telephone, or other computing device. This allows the external equipment to provide the head-mounted device with content for viewing on the head-mounted device and/or allows the head-mounted device to otherwise interact with the remote equipment. The wireless communications circuitry may include multiple antennas.

The head-mounted device may have one or more cameras. For example, forward-facing (front-facing) cameras may allow the head-mounted device to monitor movement of the head-mounted device relative to the environment surrounding the head-mounted device (e.g., the cameras may be used in forming a visual odometry system or part of a visual inertial odometry system). Forward-facing cameras may also be used to capture images of the environment that are displayed to a user of the head-mounted device. If desired, images from multiple forward-facing cameras may be merged with each other and/or forward-facing camera content can be merged with computer-generated content for a user.

Figure 1:
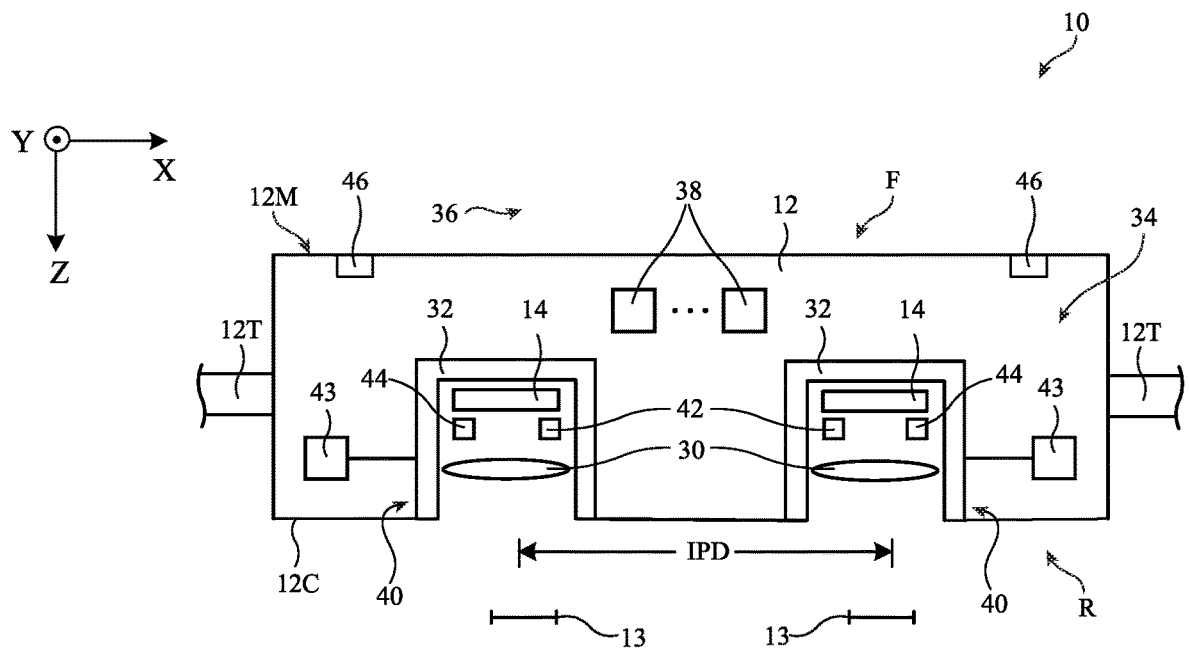
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. Housing portion 12M may also have internal support structures such as a frame and/or structures that perform multiple functions such as controlling airflow while providing structural support. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one more cameras such as cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Cameras 46 that are mounted on front face F and that face outwardly (towards the front of device 10 and away from the user) may sometimes be referred to herein as forward-facing or front-facing cameras. Forward-facing cameras (e.g., cameras 46 of FIG. 1) may include a first set of two or more front-facing cameras on the left side of front face F of device 10 and/or may include a second set of two or more front-facing cameras on the right side of front face F of device 10. Cameras 46 may also be provided elsewhere in housing portion 12M. Cameras 46 may, if desired, include cameras that are oriented at a slight angle relative to the −Z axis of FIG. 1. For example, some of cameras 46 may be oriented directly ahead, whereas some cameras 46 along the left and right edges of front face F may be respectively angled slightly to the left and right of the −Z axis to capture peripheral images on the left and right. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with optical module positioning systems in housing 12. The positioning systems may have guide members and actuators 43 that are used to position optical modules 40 with respect to each other.

Actuators 43 can be manually controlled and/or computer-controlled actuators (e.g., computer-controlled motors) for moving support structures (lens barrels) 32 relative to each other. Information on the locations of the user's eyes may be gathered using, for example, cameras 42. The locations of eye boxes 13 can then be adjusted accordingly.

Figure 2:
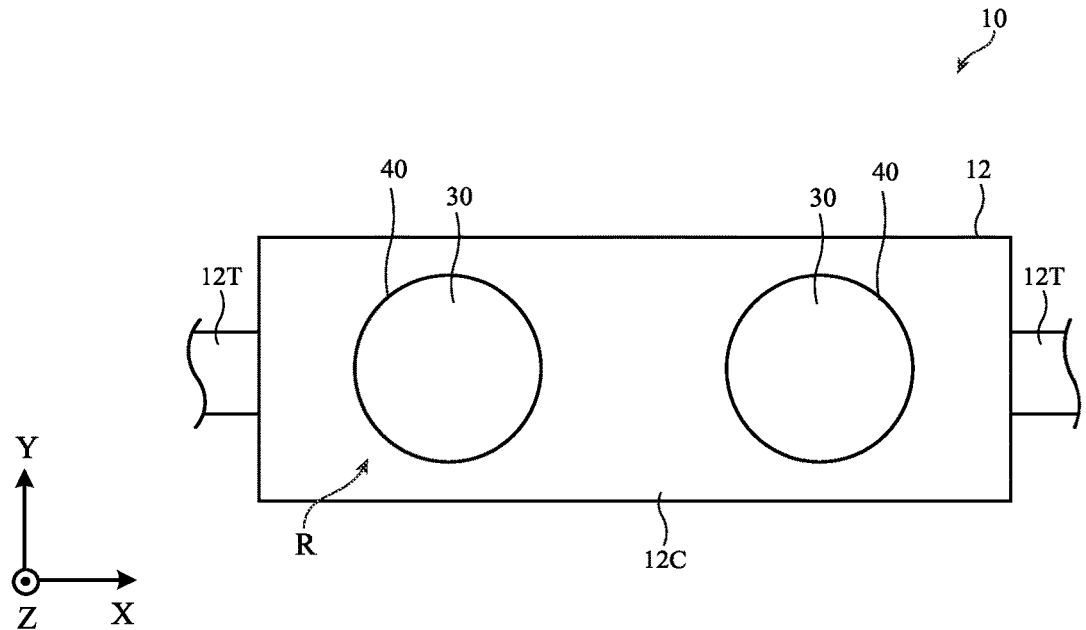
FIG. 2 is a rear view of an illustrative head-mounted device in accordance with an embodiment.

As shown in the rear view of device 10 of FIG. 2, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
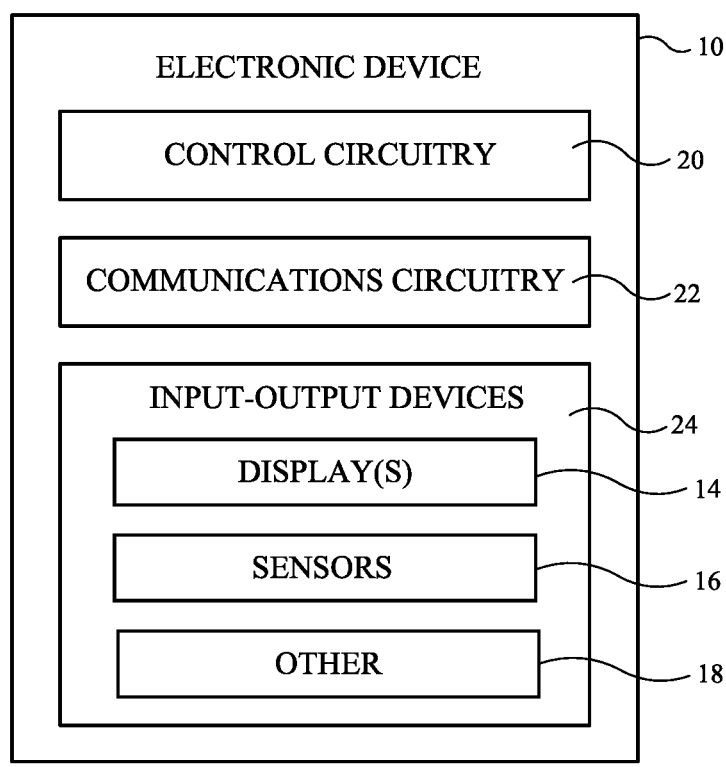
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Housing 12 may include support structures for optical modules 40 and other components of device 10. In an illustrative configuration, housing 12 may include a head-mounted support structure such as frame 12I of FIG. 4. Frame 12I may have support structures that run vertically (e.g., frame portion 12I-M in the middle of device 10 that are aligned with the user's nose bridge) and may have support structures that run horizontally across the top edge of housing 12, along the bottom of edge of housing 12, and along the left and right edges of housing 12 (see, e.g., peripheral edge portion 12I-E). This forms left and right openings in frame 12I that receive, respectively, left and right optical modules 40. There may, in general, be one or more supporting members in device housing 12 that help create housing portion 12M and that support the components in housing portion 12M. The frame 12I of FIG. 4 is illustrative.

Figure 4:
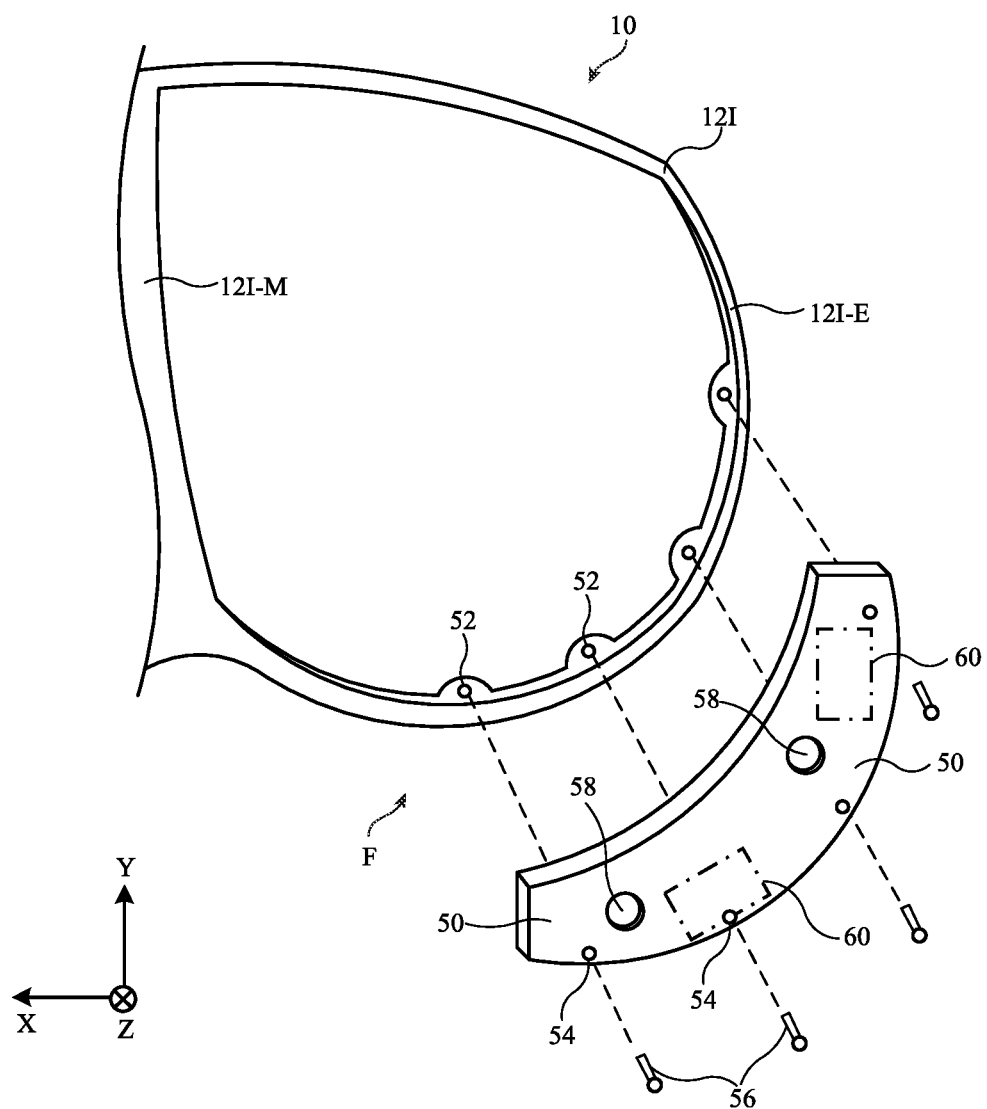
FIG. 4 is an exploded view of a portion of a head-mounted device with a head-mounted housing frame and camera support member in accordance with an embodiment.

As shown in FIG. 4, one or more component support structures such as camera support structure 50 may be coupled to frame 12I (e.g., left and right camera support structures 50 may be attached to respective left and right peripheral edges such as edge portions 12I-E of frame 12I). Support structures for device 10 such as frame 12I and camera support structure 50 may be formed from polymer, glass, ceramic, metal, carbon-fiber composite material or other fiber-composite material, other materials, and/or combinations of these materials (e.g., sheets of rigid polymer or other material, and/or other structural members).

There may be multiple component support structures coupled to frame 12I. For example, there may be a right-hand camera support structure 50 coupled to a right side of frame 12I and a left-hand camera support structure 50 coupled to a left side of frame 12I. A single side of frame 12I and corresponding camera support structure 50 is shown in the example of FIG. 4.

Camera support structure 50 may be coupled to frame 12I using adhesive, welds, screws or other fasteners, mating engagement structures (e.g., recesses and protrusions for forming a snap fit), press-fit connections, and/or other coupling arrangements. In the example of FIG. 4, fasteners 56 (e.g., threaded fasteners such as screws) pass through through-hole openings 54 of camera support structure 50 and are received in corresponding openings 52 of frame 12I. Openings 52 may be threaded openings or may be unthreaded through-hole openings in configurations in which fasteners 56 are supplied with corresponding threaded nuts (as examples).

Camera support structure 50 may be configured to receive cameras 46 (e.g., structure may have recesses, openings, and/or other structures configured to receive front-facing cameras). As an example, camera support structures 50 may have at least two openings 58 (e.g., through-hole openings), each of which is configured to receive an associated camera. Each camera 46, which may sometimes be referred to as a camera module, may have a camera module housing and may have a lens and image sensor coupled to the camera module housing. Cameras 46 may be sensitive to any suitable wavelengths of light (e.g., infrared, visible, both infrared and visible, and/or other wavelengths), may be stereoscopic (three-dimensional) cameras or two-dimensional cameras, may be time-of-flight cameras, may be structured light three-dimensional cameras may be cameras that gather information for use in placing virtual objects in a scene containing real-world and virtual content, may be cameras that are used as part of a visual odometry system, and/or may be other imaging systems. If desired, other optical components may be mounted to camera mounting structure 50. For example, ambient light sensors, proximity sensors, and/or other components that emit and/or detect light may be mounted to structure 50. Configurations in which two or more cameras 46 are attached to each camera mounting structure 50 may sometimes be described herein as an example.

When cameras 46 are received within respective openings 58 of a rigid unitary camera support structure 50 and/or are otherwise mounted to camera support structure 50, the relative position of these cameras becomes fixed. This ensures that the direction in which each camera is pointing (e.g., the orientation of the camera's field of view) is fixed relative to the other, thereby helping to avoid misalignment issues arising from cameras orientations that vary during use of device 10. By attaching camera support structure 50 to frame 12I, the rigidity and strength of frame 12I may be enhanced. This helps ensure that housing portion 12M is sturdy and able to maintain sensitive components such as optical modules 40 in alignment with each other in the event that device 10 is subjected to an undesired drop event.

Camera support structure 50 may be formed from a layer of polymer or other material with optional ribs and/or other features to help strengthen structure 50 without adding excessive weight. To help maintain the rigidity and strength of camera support structure 50, support structure 50 may be partly or completely free of large notches along the periphery of structure 50. This may help ensure that there are no portions with locally narrowed widths along the length of structure 50 that could compromise the rigidity of structure 50. The width of support structure may be relatively large near the middle of structure 50. For example, support structure 50 may have a maximum width across its shorter lateral dimension that is at least 2 mm, at least 4 mm, at least 8 mm, at least 16 mm, at least 32 mm, less than 40 mm, less than 25 mm, less than 18 mm, less than 15 mm, less than 10 mm, less than 7 mm, or other suitable value. The longitudinal dimension (length) of support structure 50 may be at least 2 cm, at least 4 cm at least 8 cm, at least 16 cm, less than 20 cm, less than 14 cm, less than 10 cm, less than 6 cm, less than 4 cm, or other suitable value. The minimum thickness of support 50 may be at least 0.3 mm, at least 0.6 mm, at least 1.2 mm, at least 2.4 mm, less than 5 mm, less than 2.5 mm, less than 1.3 mm, less than 0.8 mm, less than 0.5 mm, or other suitable value.

In addition to supporting cameras 46 and/or other optical components, camera support structure 50 may serve as a support for wireless communications components such as antennas 60. In the example of FIG. 4, camera support structure 50 serves as a support member for a pair of antennas 60. In general, camera support structure 50 may support at least one antenna, at least two antennas, at least three antennas, fewer than ten antennas, 2-5 antennas, or other suitable number of antennas. Antennas 60 may be formed using any suitable antenna types. For example, antennas 60 may include antennas with resonating elements that are formed from loop antenna structures, patch antenna structures, inverted-F antenna structures, slot antenna structures, planar inverted-F antenna structures, monopoles, dipoles, helical antenna structures, Yagi (Yagi-Uda) antenna structures, hybrids of these designs, etc. If desired, one or more of antennas 60 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 60 can be configured to receive both satellite navigation system signals and signals for other communications bands (e.g., wireless local area network signals and/or cellular telephone. Antennas 60 may be formed from metal members, patterned thin-film metal layers, and/or other conductive structures.

Figure 5:
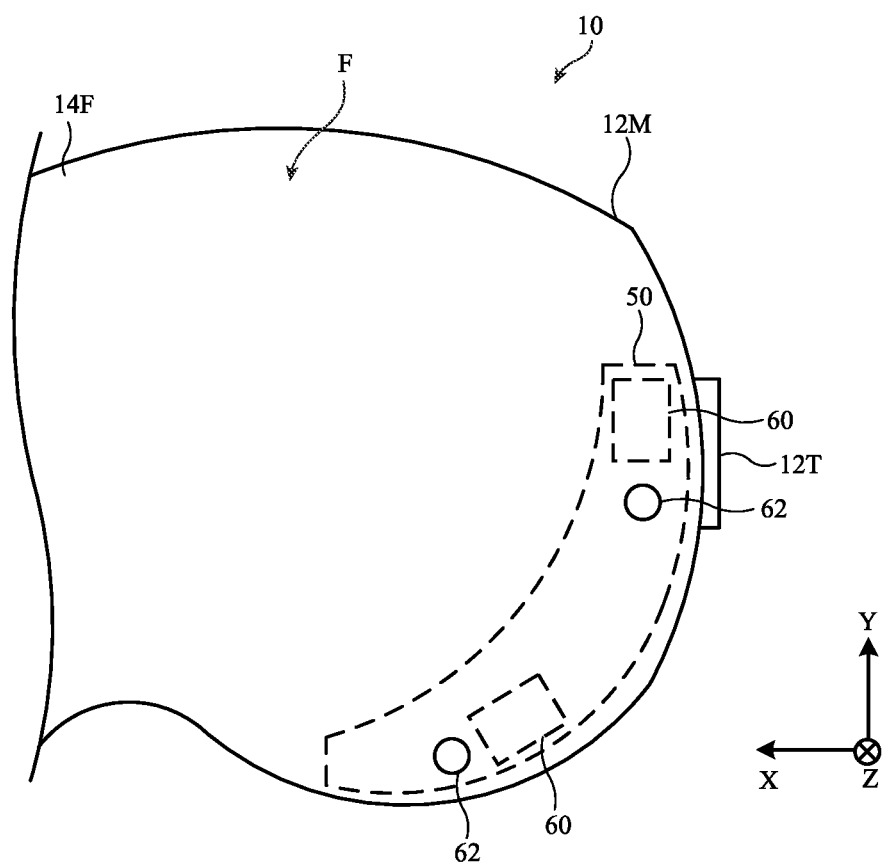
FIG. 5 is a front view of a portion of a head-mounted device with a camera support structure in accordance with an embodiment.

The front face of device 10 may be covered with an inactive housing wall (e.g., a polymer layer). In the example of FIG. 5, front face F of device 10 is covered by display 14F (e.g., an organic light-emitting diode display, a microLED display, an electrophoretic display, liquid crystal display, etc.). The pixels of display 14F may be covered with an outer protective display cover layer (e.g., a layer of glass, a layer of clear polymer, etc.).

Optical windows such as camera windows 62 may be provided in the display cover layer. Camera windows 62 may be formed from portions of the display cover layer or from clear window structures that are mounted in openings in the display cover layer. Each optical window may overlap a corresponding optical component and may allow light from the component to be emitted through the optical window and/or may allow ambient light from the environment to pass to the optical component. Camera windows 62 (e.g., camera windows in the display cover layer for display 14F and/or optical windows formed in other portions of housing 12) may have optical characteristics that allow an associated optical component to operate satisfactorily. Consider, as an example, a camera window 62 that overlaps one of forward-facing cameras 46. As shown in FIG. 5, camera support structure 50 may be mounted in the interior of device 10 so that cameras 46 are aligned with camera windows 62 and so that antennas 60 are overlapped by the display cover layer for display 14F. Each camera window 62 may have a visible-light and/or infrared-light transparency level sufficient to allow the forward-facing camera 46 that is overlapped by that window to capture images of real-world objects in the user's environment and/or to gather other image data. The transmission of camera window 62 may be, as an example, at least 50%, at least 90%, at least 95%, or other suitable value (at visible and/or infrared wavelengths). Non-camera components (e.g., an ambient light sensor, an optical proximity sensor, etc.) may have optical windows with other transmission values.

Figure 6:
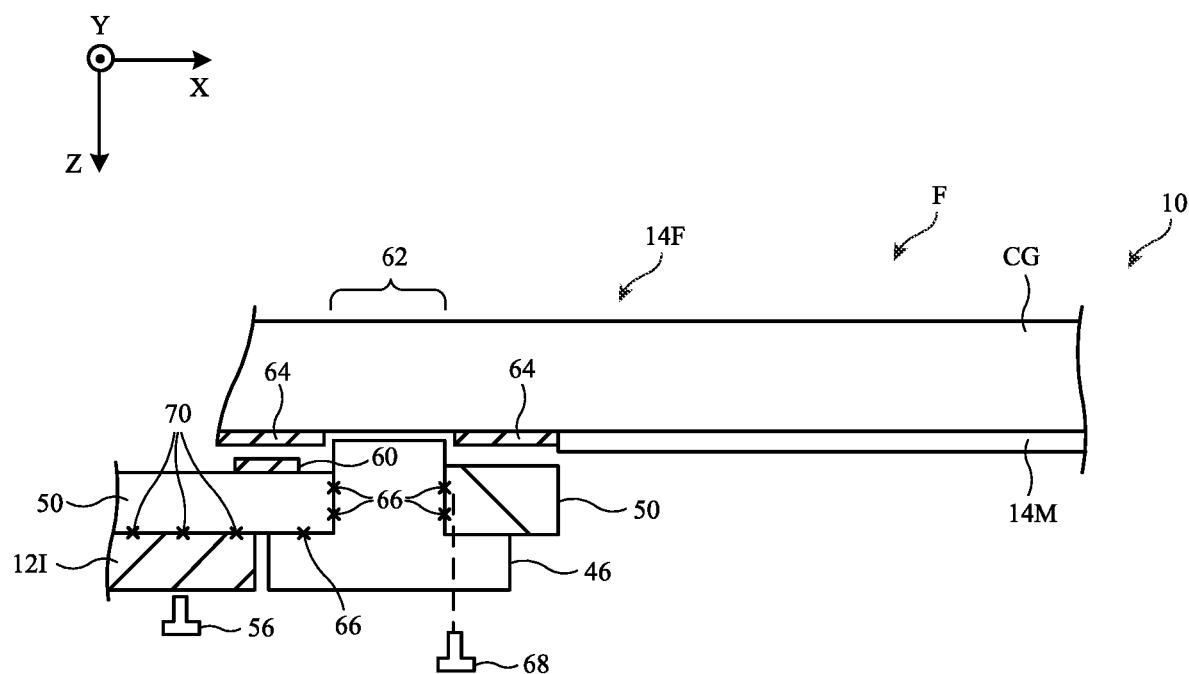
FIG. 6 is a cross-sectional side view of a portion of an illustrative head-mounted device with a camera support structure in accordance with an embodiment.

FIG. 6 is a cross-sectional view of a portion of device 10 in an illustrative configuration in which display 14F is formed on front face F of device 10. As shown in FIG. 6, display 14F includes pixel array 14M (e.g., a display layer such as an organic light-emitting diode display layer, an array of crystalline light-emitting diodes, an electrophoretic display layer, a liquid crystal display layer, etc.). Display cover layer CG of display 14F may cover and protect pixel array 14M. During operation, display 14F may present images to a user (while device 10 is or is not being worn on a user's head). If desired, display 14F may have touch screen functionality, so that a user may supply touch input to front face F of device 10.

Camera 46 may be located at the edge of display 14F (e.g., outside of the active area of the display), camera 46 may operate through an opening in pixel array 14M, and/or camera 46 may sense light that passes through gaps in the opaque structures of pixel array 14M. In the illustrative configuration of FIG. 6, camera 46 is located in an inactive display border region that is free of pixels. As shown in FIG. 6, camera window 62 may be formed from an opening in opaque masking layer 64 that allows light to pass through display cover layer CG. Opaque masking layer 64 may be, as an example, a layer of black ink that is formed on the inner surface of display cover layer CG.

Camera 46 may be mounted to an opening in camera support structure 50 using bonds 66 (e.g., adhesive bonds, welds, etc.), using screws or other fasteners such as illustrative fastener 68, or using other attachment mechanisms (press-fit connections, mating engagement structures, etc.). In turn, camera support structure 50 may be attached to frame 12I by heat stakes (e.g., heat staked protrusions extending from camera support structure 50 into mating openings in frame 12I and/or heat staked protrusions extending from frame 12I into openings), adhesive, welds (e.g., laser welds joining a metal camera support structure to a metal frame, laser welds joining polymer camera support structure to a polymer frame, and/or other welds), press-fit connections, mating engagement structures (e.g., snaps), or other attachment structures 70 and/or screws or other fasteners 56 (e.g., screws that are received within threaded openings in camera support structure 50 and/or frame 12I, screws that are received within insert nuts, etc.).

As shown in FIG. 6, antenna 60 may be formed from conductive antenna structures (e.g., metal traces, stamped metal foil, etc.) supported by camera support structure 50. During operation, antenna 60 may transmit and/or receive wireless signals that pass through display cover layer CG and other portions of housing 12M.

Figure 7:
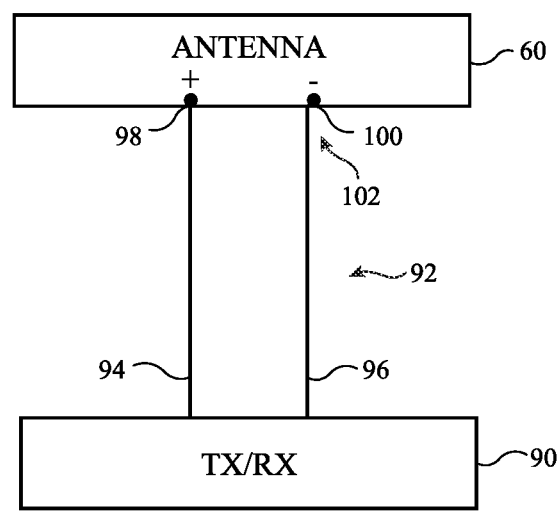
FIG. 7 is a schematic diagram of illustrative wireless communications circuitry in accordance with an embodiment.

A schematic diagram of an illustrative antenna (antenna 60) coupled to illustrative radio-frequency transceiver circuitry 90 is shown in FIG. 7. Communications circuitry 22 of FIG. 3 may include transceiver circuitry 90 (FIG. 7) and/or other wireless circuitry formed from one or more integrated circuits, power amplifier circuitry, low-noise input amplifiers, passive radio-frequency (RF) components, one or more antennas 60, transmission lines, and other circuitry for handling RF wireless signals.

Radio-frequency transceiver circuitry 90 of FIG. 7 may use antenna 60 for handling various radio-frequency communications bands. For example, circuitry 90 may include wireless local area network transceiver circuitry (e.g., circuitry 90 may handle 2.4 GHz and 5 GHz bands for WiFi® (IEEE 802.11) communications) and may handle the 2.4 GHz Bluetooth® communications band. If desired, circuitry 90 may use cellular telephone transceiver circuitry or other circuitry for handling cellular telephone wireless communications and/or other wireless communications in frequency ranges such as a communications band from 700 to 2700 MHz, 3.4-3.6 GHz, 450-6 GHz, 24-53 GHz, 5-8 GHz, 60-90 GHz, and/or other communications bands. Circuitry 90 may handle voice data and non-voice data.

Transceiver circuitry 90 may include satellite navigation system circuitry such as Global Positioning System (GPS) receiver circuitry for receiving GPS signals at 1575 MHz or for handling other satellite positioning data (e.g., GLO- NASS signals at 1609 MHz). Satellite navigation system signals are received from a constellation of satellites orbiting the earth.

In satellite navigation system links, cellular telephone links, and other long-range links, wireless signals are typically used to convey data over thousands of feet or miles. In WiFi® and Bluetooth® links at 2.4 and 5 GHz and other short-range wireless links, wireless signals are typically used to convey data over tens or hundreds of feet. If desired, device 10 may include millimeter wave wireless transceiver circuitry. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 10 can be switched out of use and higher-performing antennas used in their place. Circuitry 90 can include circuitry for other short-range and long-range wireless links if desired. For example, circuitry 90 may include circuitry for receiving television and radio signals, paging system transceivers, near field communications (NFC) circuitry, etc. If desired, circuitry 90 and/or other wireless circuitry may use antennas such as antenna 60 for radio-frequency sensorng (e.g., to determine the orientation and/or distance between device 10 and other wireless equipment, to form radar-based sensors, etc.).

As shown in FIG. 7, radio-frequency transceiver circuitry 90 may be coupled to antenna feed 102 of antenna 60 using transmission line 92. Antenna feed 102 may include a positive antenna feed terminal such as positive antenna feed terminal 98 and may have a ground antenna feed terminal such as ground antenna feed terminal 100. Transmission line 92 may be formed from metal traces on a printed circuit or other conductive structures and may have a positive transmission line signal path such as path 94 that is coupled to terminal 98 and a ground transmission line signal path such as path 96 that is coupled to terminal 100. Transmission line paths such as path 92 may be used to route antenna signals within device 10. For example, transmission line paths may be used to couple antenna structures such as one or more antennas in an array of antennas to transceiver circuitry 90. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within transmission line 92 and/or circuits such as these may be incorporated into antenna 60 (e.g., to support antenna tuning, to support operation in desired frequency bands, etc.).

Device 10 may contain multiple antennas 60. The antennas may be used together or one of the antennas may be switched into use while other antenna(s) are switched out of use. If desired, control circuitry 20 may be used to select an optimum antenna to use in device 10 in real time and/or to select an optimum setting for adjustable wireless circuitry associated with one or more of antennas 60. Antenna adjustments may be made to tune antennas to perform in desired frequency ranges, to perform beam steering with a phased antenna array, and to otherwise optimize antenna performance. Sensors may be incorporated into antennas 60 to gather sensor data in real time that is used in adjusting antennas 60.

Figure 8:
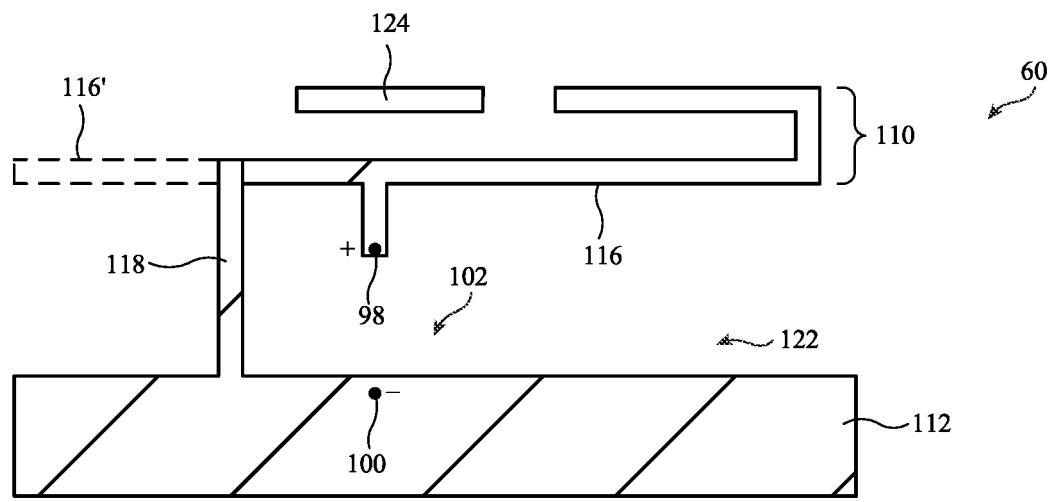
FIG. 8 is a diagram of an illustrative antenna in accordance with an embodiment.

FIG. 8 is a diagram of an illustrative antenna that may be used in device 10. In the example of FIG. 8, antenna 60 is an inverted-F antenna. As shown in FIG. 8, antenna 60 may include an antenna resonating element such as antenna resonating element 110 and an antenna ground such as antenna ground 112. Antenna resonating element 110 may have one or more branches such as antenna resonating element arm 116 and optional antenna resonating element arm 116'. Return path 118 (sometimes referred to as a short circuit path) may be coupled between resonating element arm 116 and ground 112. Antenna feed 102 may include positive antenna feed terminal 98 and ground antenna feed terminal 100 and may be coupled between element 110 (e.g., arm 116) and ground 112 in parallel with return path 118. One or more optional components (switches, tunable circuits such as tunable capacitors, tunable inductors, etc.) may be coupled between antenna ground 112 and resonating element arm 116 and may be adjusted to tune antenna 60. The configuration of FIG. 8 in which no tunable components are coupled between arm 116 and ground 112 is merely illustrative.

Antenna resonating element arm 116 may be separated from ground 112 by dielectric opening 122. If desired, opening 122 may form a slot antenna element that contributes to the antenna response of antenna 60. In the example of FIG. 8, antenna 40 is an inverted-F antenna that does not include a slot antenna element.

Optional parasitic antenna elements such as optional parasitic element 124 may be included in antenna 60 to adjust the frequency response of antenna 60.

Antennas such as antenna 60 of FIG. 8 (e.g., inverted-F antennas, slot antennas, hybrid inverted-F slot antennas, etc.) and/or other types of antenna 60 (e.g., patch antennas, loop antennas, etc.) may be used in supporting any suitable operations involving transmission and/or reception of wireless signals.

Antennas (e.g., antenna resonating elements, parasitic elements, antenna ground structures, feed structures, and/or other structures for each antenna 60) may be formed from conductive structures such as metal members (e.g., metal structures formed from wireless, machined metal parts, stamped sheet metal, etc.), metal traces (e.g., patterned metal deposited by physical vapor deposition or laser-assisted deposition techniques), other conductive materials (e.g., carbon nanowires, etc.), and/or other conductive antenna structures. These conductive structures may be supported by substrates such as rigid and/or flexible printed circuit substrates, by polymer housing structures (e.g., by portions of camera support structure 50), dielectric members formed from glass, ceramic, and/or other dielectric, and/or other antenna support structures.

FIGS. 9, 10, 11, and 12 are cross-sectional side views of illustrative conductive antenna structures 126 for use in forming antennas 60.

Figure 9:
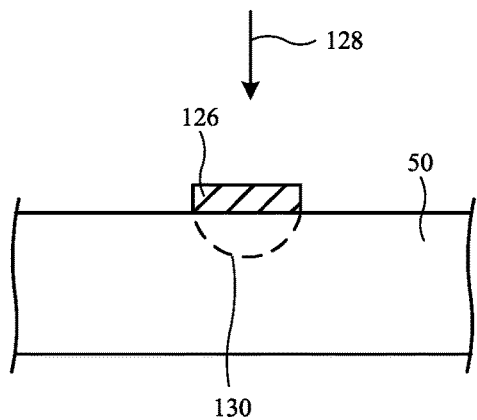
FIGS. 9, 10, 11, and 12 are cross-sectional side views of portions of a support structure such as a camera support structure with antennas in accordance with embodiments.

In the illustrative configuration of FIG. 9, laser direct structuring (LDS) techniques are being used to form antenna structures 126. Laser beam 128 is used to selectively illuminate area 130 on the surface of a dielectric antenna support structure such as structure 50. Structure 50 in the example of FIG. 9 may be formed from polymer with additives to help sensitize structure 50 to laser light exposure. After laser light exposure with beam 128, electroplating operations are used to selectively electrodeposit conductive structures 126 on area 130 without depositing the conductive structures elsewhere on the exposed surface of structure 50, thereby forming structures 126 with a desired antenna shape (e.g., to form an antenna resonating element, parasitic element, ground, and/or other patterned antenna structures as shown in FIG. 8).

Figure 10:
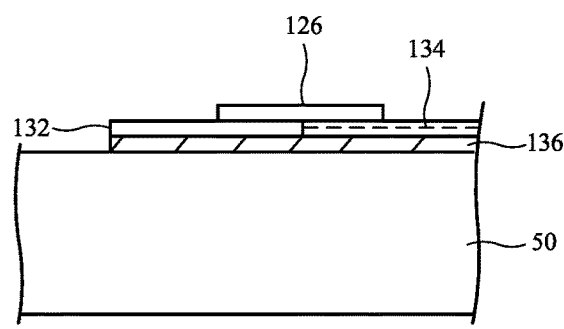

In the example of FIG. 10, conductive antenna structures 126 are metal traces deposited on printed circuit 132. These metal traces may be deposited by physical vapor deposition and patterned using photolithography, and/or may be formed using other deposition and patterning techniques. Metal traces 134 of printed circuit 132 may help convey radio-frequency signals to and/or from antenna structures 126. Adhesive 136 may be used to attach printed circuit 132 to a surface of support structure 50.

If desired, conductive antenna structures 126 can be formed from metal structures embedded in support structure 50. For example, metal antenna structures (wire, metal foil, structural metal members, sheet metal parts, and/or other conductive antenna structures forming antenna structures 126) can be embedded in polymer that forms support structure 50, as shown in FIG. 11 (e.g., one or more shots of polymer for support structure 50 may be molded over conductive antenna structures 126).

Figure 12:
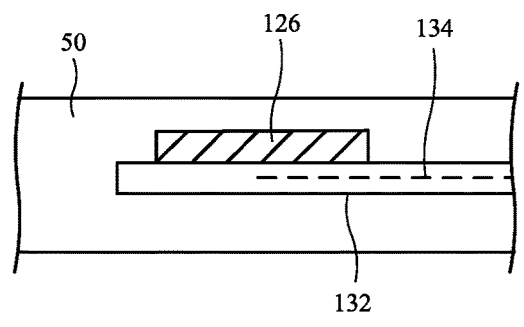

In the illustrative example of FIG. 12, printed circuit 132 has metal traces forming conductive antenna structures 126 and metal traces 134 forming signal paths such as transmission lines. As shown in FIG. 12, printed circuit 132 may be embedded within support structure 50 (e.g., polymer forming support structure 50 may be molded over printed circuit 132).

Figure 11:
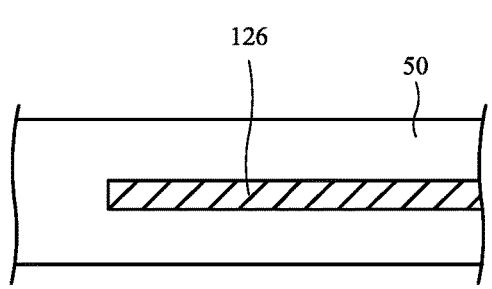

The arrangements of FIGS. 9, 10, 11, and/or 12 and/or other arrangements may be used in forming antennas 60 on camera support structure 50, while camera support structure 50 simultaneously serves as a support and alignment member for cameras 46.

Figure 13:
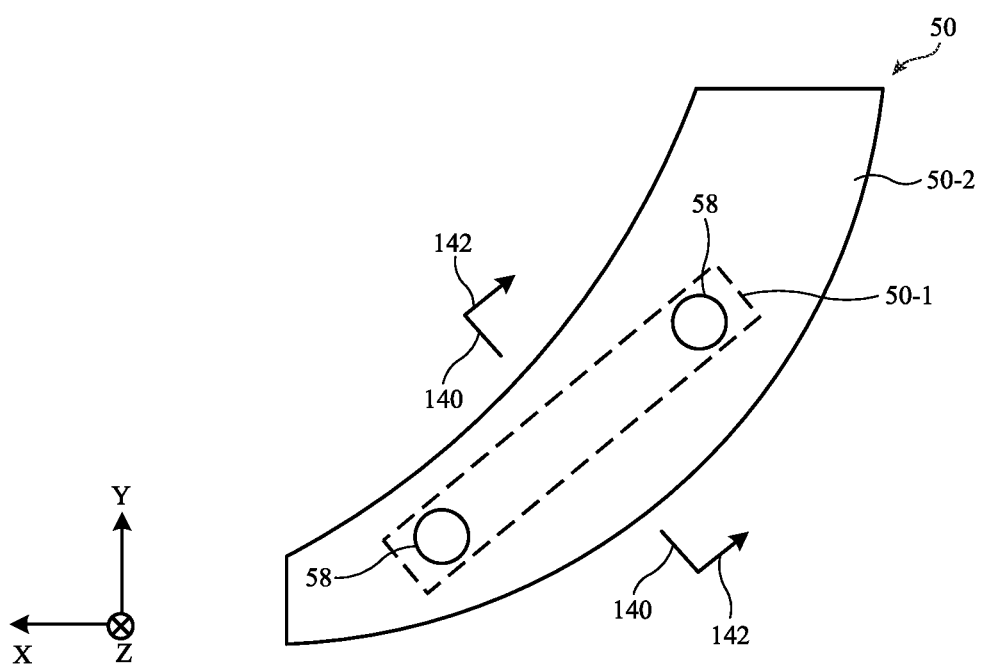
FIG. 13 is a top view of an illustrative camera support structure in accordance with an embodiment.

FIG. 13 is a top view of an illustrative camera support structure formed using multiple shots of polymer. One shot of polymer forms portion 50-1 of camera support structure 50 and another shot of polymer forms portion 50-2 of camera support structure 50. Portion 50-1 may, as an example, include fibers or other filler embedded in the shot of polymer forming portion 50-1 or portion 50-1 may have an embedded fiber-composite member (e.g., a stiffening member formed from a rod, strip, or other elongated member of carbon-fiber material or other stiffening member). This may help to locally stiffen and strengthen portion 50-1 (e.g., to enhance the stiffness of portion 50-1 relative to portion 50-2). As shown in FIG. 13, stiffening member 50M may extend between openings 58 (and therefore cameras 46) to prevent bending of the intervening portion of structure 50 (e.g., to prevent bending of structure 50 out of the X-Y plane of FIG. 13) and thereby prevent undesired bending-induced camera misalignment. Portion 50-1 may, if desired, be free of conductive material such as conductive carbon fibers (e.g., to reduce the presence of conductive material that could interfere with the operation of overlapping antennas).

Figure 14:
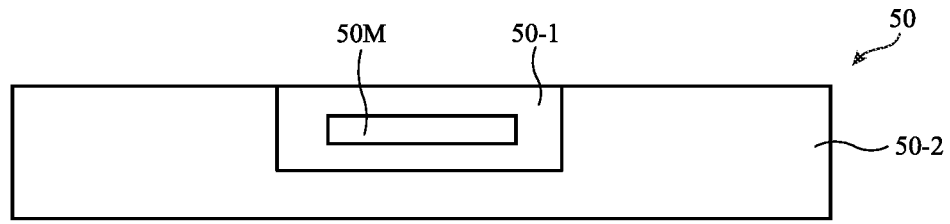
FIG. 14 is a cross-sectional side view of an illustrative camera support structure in accordance with an embodiment.

FIG. 14 is a cross-sectional side view of camera support structure 50 taken along line 140 of FIG. 13 and viewed in direction 142 of FIG. 13. As shown in FIG. 14, camera support structure 50 may include an embedded stiffening structure such as fiber-composite stiffening member 50M (e.g., an elongated strip-shaped carbon-fiber stiffening member). Member 50M may be embedded within portion 50-2. Portions 50-1 and 50-2 may be formed from first and second shots of molded polymer material or may be formed using other techniques.

Figure 15:
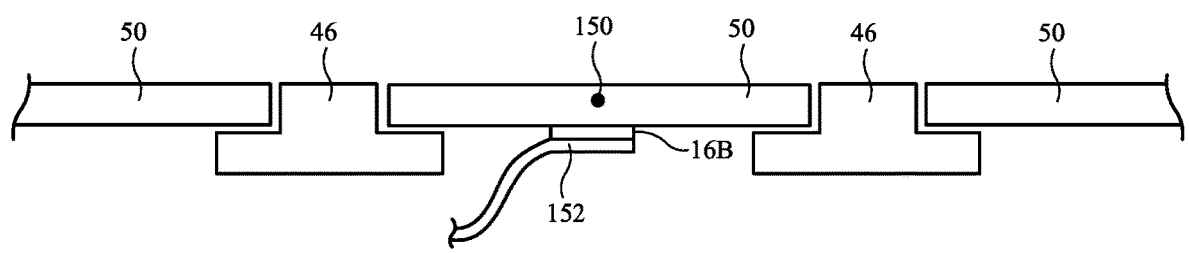
FIG. 15 is a cross-sectional side view of a portion of a camera support structure with a bend sensor to detect camera misalignment in accordance with an embodiment.

It may be desirable to detect misalignment of cameras 46 due to deformation of camera support structure 50. As shown in the cross-sectional side view of structure 50 of FIG. 15, a bend sensor such as sensor 16B may be mounted to camera support structure 50 between cameras 46. Sensor 16B may be a strain gauge or other sensor that is configured to detect bending of structure 50 (e.g., bending about bend axis 150). Flexible printed circuit 152 may have signal lines that carry bending measurements to control circuitry 20 (FIG. 3). In response to measuring bending in structure 50, control circuitry 20 can take corrective action to compensate for any predicted misalignment between cameras 46. For example, if cameras 46 are detected as being misaligned by 1° from data gathered by sensor 16B, control circuitry 20 can digitally compensate for the measured misalignment (e.g., by shifting and/or warping the camera image data gathered by cameras 46 to ensure that the images from cameras 46 can be stitched together as desired or otherwise used as desired in operating device 10).

Figure 16:
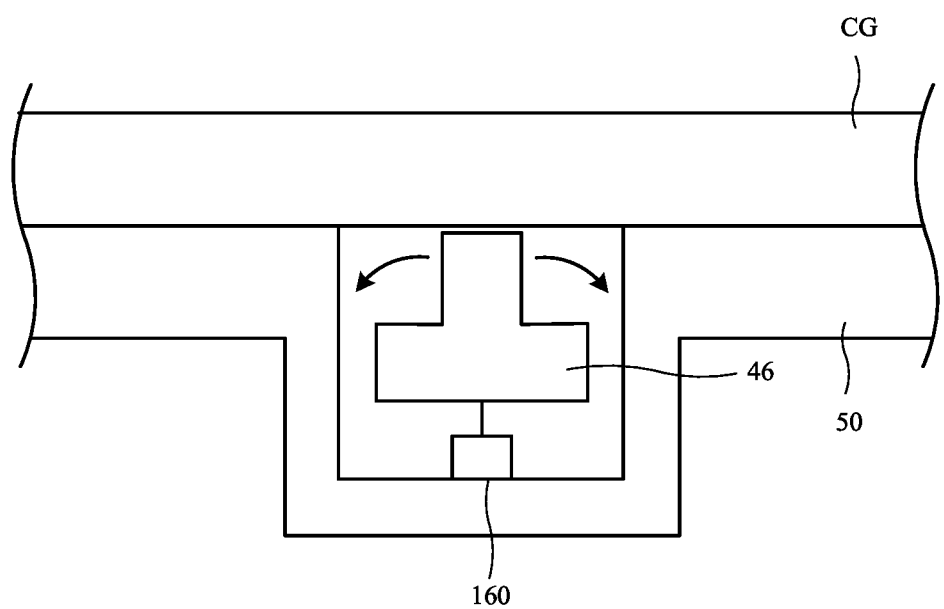
FIG. 16 is a cross-sectional side view of a portion of a camera support structure with an adjustable-orientation camera in accordance with an embodiment.

If desired, device 10 may have one or more camera positioning devices such as actuator 160 of FIG. 16. Actuator 160 can change the angular orientation of camera 46 relative to structure 50. In response to detecting with sensor 16B that structure 50 has bent about axis 150 of FIG. 15 by 2°, for example, control circuitry 20 may direct actuator 160 to move camera 46 to compensate. For example, camera 46 may be tilted in an opposing direction by a compensating amount (e.g., −2°), thereby ensuring that cameras 46 remain aligned even if structure 50 experiences deformation during operation of device 10.

The use of a strain gauge to detect bending is illustrative. Any suitable sensor 16 may be used to detect camera misalignment due to deformation of support structure 50. The effects of camera misalignment may be compensated by physically steering optical components such as cameras 46 (as described in connection with FIG. 16), by processing the image data from cameras 46 (e.g., image warping, etc.), and/or by otherwise compensating for detected misalignment. The examples of FIGS. 13, 14, 15, and 16 are illustrative.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of; or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
a head-mounted housing structure;
a camera support structure having a first surface at which the camera support structure is attached to the head-mounted housing structure and having a second surface opposite the first surface;
a first camera mounted to the camera support structure at a first location;
a second camera mounted to the camera support structure at a second location; and
an antenna on the camera support structure and having a conductive antenna structure at the second surface of the camera support structure.

2. The head-mounted device defined in claim 1 further comprising:
an embedded stiffening member in the camera support structure that extends between the first and second cameras; and
a bend sensor configured to measure misalignment of the first and second cameras by detecting bending of the camera support structure.

3. The head-mounted device defined in claim 1 wherein the camera support structure comprises a polymer member.

4. The head-mounted device defined in claim 3 wherein the conductive antenna structure comprises a metal trace on the polymer member.

5. The head-mounted device defined in claim 3 wherein the antenna comprises a metal structure embedded within the polymer member.

6. The head-mounted device defined in claim 3 wherein the conductive antenna structure comprises a metal trace on a flexible printed circuit that is attached to the second surface of the camera support structure by adhesive.

7. The head-mounted device defined in claim 3 wherein the antenna comprises a metal trace on a flexible printed circuit embedded within the polymer member.

8. A head-mounted device comprising:
- a head-mounted housing frame having left and right openings;
- left and right optical modules mounted in the left and right openings, respectively;
- a polymer camera support member fastened to a peripheral portion of the head-mounted housing frame, wherein the polymer camera support member comprises first and second openings configured to receive, respectively, first and second cameras; and
- an antenna that includes an antenna resonating element on a printed circuit, the printed circuit being supported by the polymer camera support member and overlapping an area of the polymer camera support member.

9. The head-mounted device defined in claim 8 further comprising:
- an additional antenna that is supported by and overlaps the polymer camera support member.

10. The head-mounted device defined in claim 9 wherein the additional antenna comprises an additional antenna resonating element on a surface of the polymer camera support member.

11. The head-mounted device defined in claim 9 wherein the additional antenna comprises an additional antenna resonating element on an additional printed circuit attached to a surface of the polymer camera support member.

12. The head-mounted device defined in claim 9 wherein the additional antenna comprises metal structures embedded in the polymer camera support member.

13. The head-mounted device defined in claim 9 wherein the additional antenna comprises an additional antenna resonating element on an additional printed circuit embedded in the polymer camera support member.

14. The head-mounted device defined in claim 8 wherein the polymer camera support member comprises a fiber-composite material.

15. The head-mounted device defined in claim 8 further comprising a stiffening member embedded in the polymer camera support member.

16. The head-mounted device defined in claim 15 wherein the stiffening member extends from the first opening of the polymer camera support member to the second opening of the polymer camera support member.

17. The head-mounted device defined in claim 8 further comprising an attachment structure configured to attach the polymer camera support member to the head-mounted housing frame, wherein the attachment structure comprises an attachment structure selected from the group consisting of: a heat stake, a weld, adhesive, a nut, and a screw.

18. A head-mounted device, comprising:
- a head-mounted housing structure;
- a display supported by the head-mounted housing structure, the display having a pixel array;
- a display cover layer that covers the pixel array;
- a first camera under a first area of the display cover layer;
- a second camera under a second area of the display cover layer;
- a camera support member that is attached to the head-mounted housing structure, wherein the camera support member has a first portion that receives the first camera and has a second portion that receives the second camera; and
- an antenna that is supported by the camera support member and that overlaps the camera support member under a third area of the display cover layer.

19. The head-mounted device defined in claim 18 wherein the head-mounted housing structure comprises a frame that is attached to the camera support member, the head-mounted device further comprising left and right optical modules coupled within respective left and right openings in the frame, wherein the camera support member comprises an elongated structure that is attached to the frame along a peripheral portion of the frame.

* * * * *